(12) United States Patent
Colbourne (10) Patent No.: US 10,028,040 B1
(45) Date of Patent: Jul. 17, 2018

(54) COLORLESS, DIRECTIONLESS, CONTENTIONLESS OPTICAL NETWORK USING MXN WAVELENGTH SELECTIVE SWITCHES

(71) Applicant: Lumentum Operations LLC, Milpitas, CA (US)

(72) Inventor: Paul Colbourne, Ottawa (CA)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 15/493,684

(22) Filed: Apr. 21, 2017

(51) Int. Cl.
 *H04J 14/00* (2006.01)
 *H04Q 11/00* (2006.01)
 *H04J 14/02* (2006.01)

(52) U.S. Cl.
 CPC ...... *H04Q 11/0005* (2013.01); *H04J 14/0212* (2013.01); *H04Q 2011/0009* (2013.01)

(58) Field of Classification Search
 CPC .. H04J 14/0212; H04J 14/0217; H04J 14/021; H04J 14/0213; H04J 14/0201; H04Q 11/0005; H04Q 2011/0016; H04B 10/572
 USPC ........................................................ 398/48
 See application file for complete search history.

(56) References Cited

U.S. PATENT DOCUMENTS

| | | | |
|---|---|---|---|
| 6,711,316 B2 | 3/2004 | Ducellier | |
| 8,300,995 B2 | 10/2012 | Colbourne | |
| 2012/0183294 A1* | 7/2012 | Boertjes | H04J 14/0204 398/49 |
| 2015/0256908 A1* | 9/2015 | Zhu | H04L 45/62 398/85 |
| 2016/0099851 A1* | 4/2016 | Archambault | H04J 14/0212 398/16 |
| 2016/0149664 A1* | 5/2016 | Wagener | H04J 14/0212 398/49 |
| 2016/0320562 A1* | 11/2016 | Komiya | H04Q 11/00 |

OTHER PUBLICATIONS

Zong et al., "Low-cost, Degree-expandable and Contention-free ROADM Architecture Based on M x N WSS", OFC 2016, 3 pages.

* cited by examiner

*Primary Examiner* — Don N Vo
(74) *Attorney, Agent, or Firm* — Harrity & Harrity, LLP (57) ABSTRACT

An optical node may include D (D≥2) input ports, D output ports, and D degrees. Each degree may include an inbound M×N (M≥D, N≥2D) WSS and an outbound M×N WSS. Each inbound M×N WSS may include an input connected to one of the D input ports; inputs connected to outputs of inbound M×N WSSs of the other degrees; outputs connected to inputs of outbound M×N WSSs of the other degrees; outputs connected to inputs of inbound M×N WSSs of the other degrees; and a local drop port. Each outbound M×N WSS may include an output connected to one of the D input ports; outputs connected to inputs of outbound M×N WSSs of the other degrees; inputs connected to outputs of inbound M×N WSSs of the other degrees; inputs connected to outputs of outbound M×N WSSs of the other degrees; and a local add port.

20 Claims, 6 Drawing Sheets

COLORLESS, DIRECTIONLESS, CONTENTIONLESS OPTICAL NETWORK USING MXN WAVELENGTH SELECTIVE SWITCHES

TECHNICAL FIELD

The present disclosure relates to an optical node architecture and, more particularly, to an optical node architecture that achieves colorless, directionless, contentionless (CDC) add/drop of optical signals using a group of M×N wavelength selective switches (WSSs).

BACKGROUND

An optical node (e.g., a node in a dense wavelength division multiplexed (DWDM) optical communications system) may be capable of achieving colorless, directionless, contentionless (CDC) add/drop. Colorless add/drop refers to wavelength flexibility of the optical node that allows any wavelength (i.e., "color") to be added/dropped on any add/drop port of the optical node. Directionless add/drop refers to directional flexibility of the optical node that allows an added channel to be routed to any direction served by the optical node, or incoming channels from any direction served by the optical node to be routed to a given drop port. Contentionless add/drop refers to port flexibility of the optical node that allows multiple add/drop ports of the optical node to transmit or receive channels of the same wavelength. In such a CDC optical node, multiple wavelengths may be switched to multiple fiber directions, and multiple wavelength channels of the same wavelength can be concurrently routed between a transmitter/receiver of the optical node and a target outgoing/inbound optical fiber of the optical node. Thus, the CDC-capable optical node may have increased flexibility and/or operational simplicity as compared to an optical node that cannot achieve CDC add/drop.

SUMMARY

According to some possible implementations, and optical node may include: D (D≥2) input ports; D output ports; and D degrees, each degree, of the D degrees, including an inbound M×N (M≥D, N≥2D) wavelength selective switch (WSS) and an outbound M×N WSS, where each inbound M×N WSS may include: an input that connects to a respective input port of the D input ports, D−1 common inputs that connect to D−1 drop outputs, each of a respective inbound M×N WSS of the other degrees, D−1 express outputs that connect to D−1 express inputs, each of a respective outbound M×N WSS of the other degrees, D−1 drop outputs that connect to D−1 common inputs, each of a respective inbound M×N WSS of the other degrees, and at least one local drop port, and where each outbound M×N WSS may include: an output that connects to a respective output port of the D input ports, D−1 common outputs that connect to D−1 add inputs, each of a respective outbound M×N WSS of the other degrees, D−1 express inputs that connect to D−1 express outputs, each of a respective inbound M×N WSS of the other degrees, D−1 add inputs that connect to D−1 common outputs, each of a respective outbound M×N WSS of the other degrees, and at least one local add port.

According to some possible implementations, an optical node may include: D (D≥2), input ports, D output ports, and D degrees, where each degree includes an inbound M×N (M≥D, N≥2D) wavelength selective switch (WSS) associated with a respective input port, and an outbound M×N WSS associated with a respective output port, where each inbound M×N WSS may be to: receive optical signals from one input port and from inbound M×N WSSs of other degrees, provide optical signals to the inbound M×N WSSs of the other degrees for local drop at the other degrees, provide optical signals to outbound M×N WSSs of the other degrees, for their respective output ports, and provide optical signals to local drop ports; and where each outbound M×N WSS may be to: receive optical signals from the inbound M×N WSSs of the other degrees and from the outbound M×N WSSs of the other degrees for its respective output port, receive optical signals from local add ports for its respective output port, and provide optical signals from local add ports to the outbound M×N WSSs of the other degrees for their respective output ports.

According to some possible implementations, an optical node architecture may include: D (D≥2) input ports and D output ports; and D degrees, each including an inbound M×N (M≥D, N≥2D) wavelength selective switch (WSS) and an outbound M×N WSS, where each inbound M×N WSS may include: an input that connects to a respective input port, a set of inputs that connect to a set of outputs, each of a respective inbound M×N WSS of other degrees, a set of outputs that connect to a set of inputs, each of a respective outbound M×N WSS of the other degrees, a set of outputs that connect to a set of inputs, each of a respective inbound M×N WSS of the other degrees, and at least one local drop port, and where each outbound M×N WSS may include: an output that connects to a respective output port, a set of outputs that connect to a set of inputs, each of a respective outbound M×N WSS of the other degrees, a set of inputs that connect to a set of outputs, each of a respective inbound M×N WSS of the other degrees, a set of inputs that connect to a set of outputs, each of a respective outbound M×N WSS of the other degrees, and at least one local add port.

DETAILED DESCRIPTION

The following detailed description of example implementations refers to the accompanying drawings. The same reference numbers in different drawings may identify the same or similar elements. The implementations described below are merely examples and are not intended to limit the implementations to the precise forms disclosed. Instead, the implementations were selected for description to enable one of ordinary skill in the art to practice the implementations.

Figure 1:
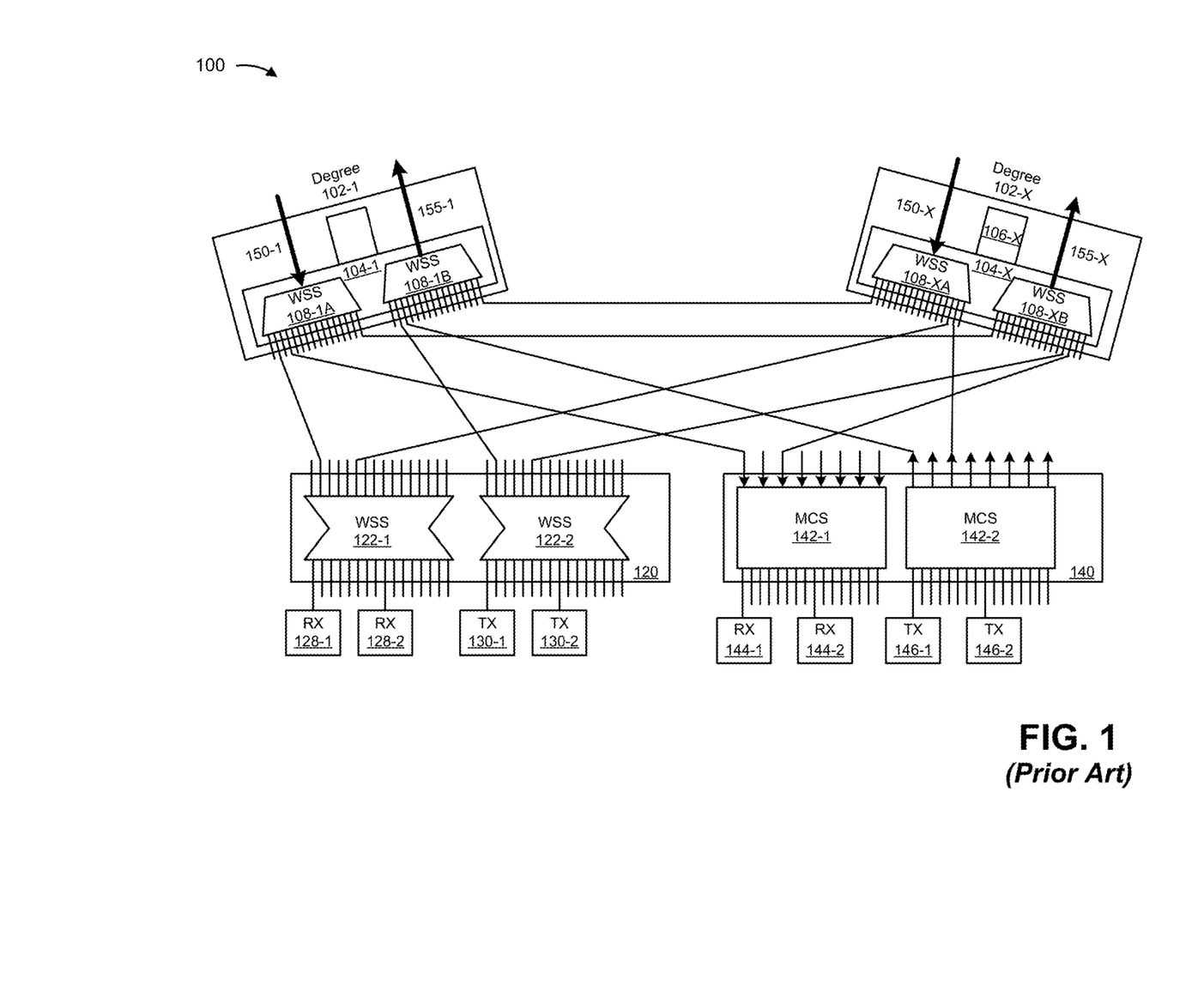
FIG. 1 is a diagram of a prior art optical node capable of achieving CDC add/drop using pairs of WSSs associated with inbound and outbound transmission fibers, layered with a set of multicast switches (MCSs) and WSSs associated with adding/dropping optical signals.

A prior art optical node may achieve CDC add/drop using an architecture that includes pairs of wavelength selective switches (WSSs), each associated with a different degree (D), layered with sets of multicast switches (MCSs) and/or WSSs that are connected to add/drop ports of the optical node and, in some cases, optical amplifiers (e.g., when insertion loss is high such that optical amplification is needed). FIG. 1 is a diagram of a prior art optical node 100 capable of achieving CDC add/drop using pairs of WSSs layered with a set of MCSs and WSSs associated with adding/dropping optical signals.

As shown in FIG. 1, prior art optical node 100 includes a set of degrees 102-1 through 102-X (X>1). As shown, each degree 102 includes a multiplexing demultiplexing stage 104 (e.g., 104-1 through 104-X) and an optical channel monitor 106 (e.g., 106-1 through 106-X). As further shown, each multiplexing/demultiplexing stage 104 includes a pair of WSSs 108 (e.g., WSS 108-1A and WSS 108-1B through WSS 108-XA and WSS 108-XB). As shown, a first WSS 108 of each pair (e.g., WSS 108-1A, WSS 108-XA) is coupled to an input fiber (e.g., 150-1, 150-X) associated with a respective degree 102, while a second WSS of each pair (e.g., WSS 108-1B, WSS 108-XB) is coupled to an output fiber (e.g., 155-1, 155-X) associated with the respective degree 102.

As further shown, prior art optical node 100 includes add/drop stage 120 and/or add/drop stage 140. As shown, add/drop stage 120 includes a set of WSSs 122 (e.g., WSS 122-1 and WSS 122-2). As shown, a first WSS 122 (e.g., WSS 122-1), associated with dropping optical signals at prior art optical node 100, may be coupled to a set of optical receivers (RX) 128. While not shown, in some cases, the first WSS 122 may be coupled to a set of splitters, where the set of splitters is coupled to the set of optical receivers (RX) 128. Similarly, a second WSS 122 (e.g., WSS 122-2), associated with adding optical signals at prior art optical node 100, may be coupled to a set of optical transmitters (TX) 130. While not shown, in some cases, the second WSS 122 may be coupled to a set of couplers, where the set of couplers is coupled to the set of optical transmitters (TX) 130. As further shown in FIG. 1, add/drop stage 140 includes a set of multicast switches (MCSs) 142 (e.g., MCS 142-1 and MCS 142-2). As shown, a first MCS 142 (e.g., MCS 142-1), associated with dropping optical signals at prior art optical node 100, is coupled to a set of optical receivers (RX) 144, while a second MCS 142 (e.g., MCS 142-2), associated with adding optical signals at prior art optical node 100, is coupled to a set of optical transmitters (RX) 146.

A degree 102 bi-directionally connects prior art optical node 100 to another optical node or an endpoint node of, for example, a DWDM optical communications system. For example, WSS 108-1A may receive an input signal from another optical node via an optical fiber. Here, if a portion of the input signal (e.g., one or more wavelength channels) is to be dropped, then WSS 108-1A may selectively provide the portion of the input signal (e.g., an optical signal including the one or more wavelength channels) on a drop path to one or more optical receivers 128 (e.g., a path from WSS 108-1A, via WSS 122-1 and splitter 124, to one or more optical receivers 128) or a drop path to one or more optical receivers 144 (e.g., a path from WSS 108-1A, via MCS 142-1, to one or more optical receivers 144). Further, if a portion of the input signal is to continue on an outgoing optical fiber of another degree 102 (i.e., is not to be dropped), then WSS 108-1A may selectively provide the portion of the input signal on an express path to an outbound WSS 108 associated with the other degree 102 (e.g., a path from WSS 108-1A to WSS 108-XB).

As another example, WSS 108-1B may provide an output signal to another optical node via an optical fiber. Here, WSS 108-1B may receive an optical signal, added at prior art optical node 100, on an add path from optical transmitter 130 (e.g., a path from optical transmitter 130, via coupler 126 and WSS 122-2, to WSS 108-1B), or on an add path from optical transmitter 146 (e.g., a path from optical transmitter 146, via MCS 142-2, to WSS 108-1B), and provide an output signal, including the optical signal, via the optical fiber. Similarly, WSS 108-1B may receive a portion of an input signal on an express path from an inbound WSS 108 (e.g., WSS 108-XA) associated with another degree 102, and may provide an output signal, including the portion of the input signal, via the optical fiber. In prior art optical node 100, any wavelength may be switched to any fiber direction (i.e., any degree), and multiple channels of the same wavelength can be concurrently routed between a transmitter/receiver of prior art optical node 100 and a target outgoing/inbound optical fiber of prior art optical node 100. In other words, prior art optical node 100 may be capable of achieving CDC add/drop.

However, while prior art optical node 100 may be capable of achieving CDC add/drop, a cost, a complexity, and/or a physical size of prior art optical node 100 may be undesirable due to the need for multiple layers of components (e.g., pairs of WSSs 108 layered with WSSs 122 and/or MCSs 142). Implementations described herein provide an architecture for an optical node that achieves CDC add/drop with a single layer of components, namely a single M×N WSS (M≥D, N≥2D) connected to each inbound fiber and each outgoing fiber. The optical node that achieves CDC using the single layer of components has a reduced cost, complexity, and/or physical size as compared to a prior art optical node that achieves CDC add/drop (e.g., prior art optical node 100).

Figure 2:
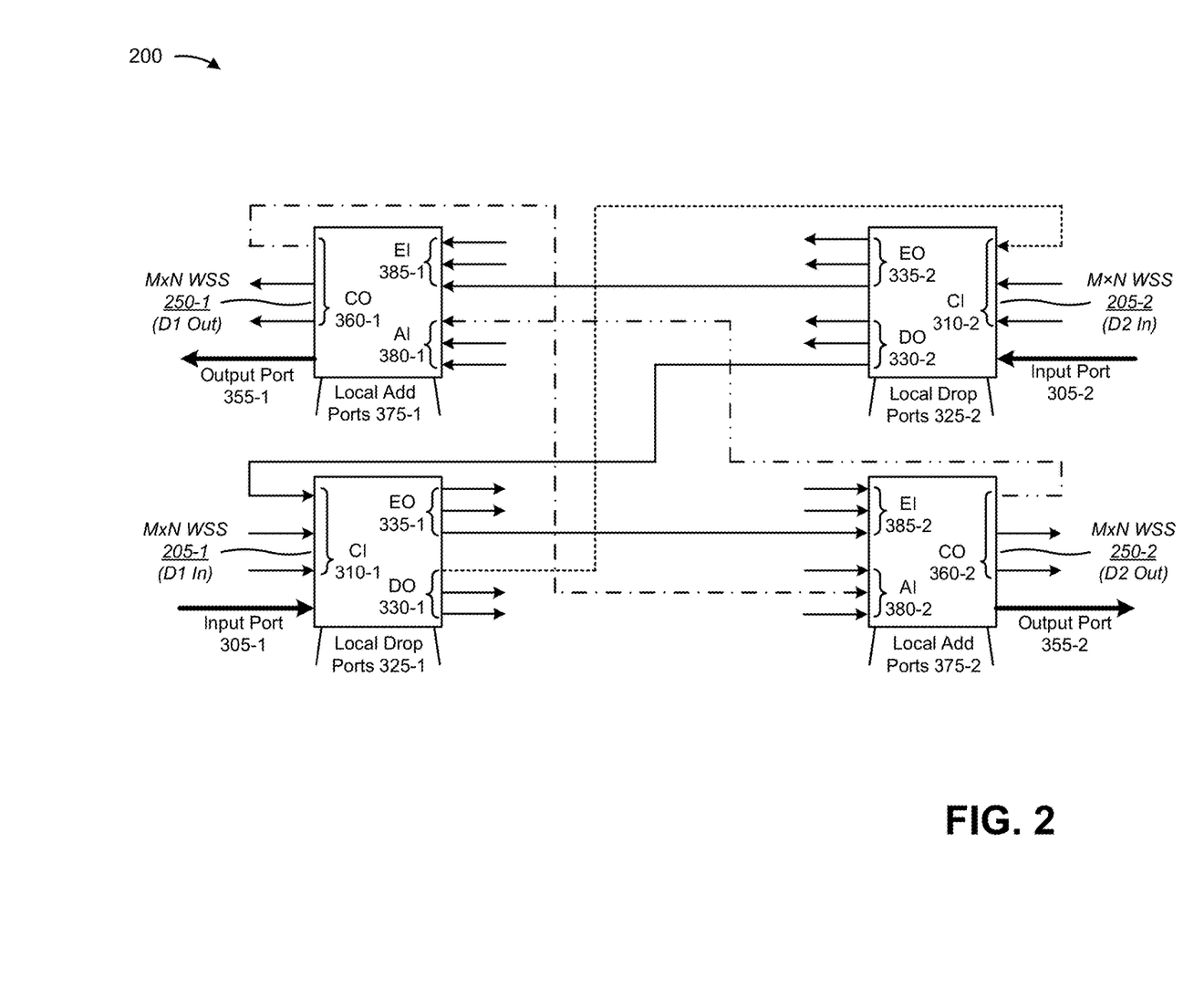
FIG. 2 is a diagram of an example optical node capable of achieving CDC add/drop using a single layer of M×N WSSs.

FIG. 2 is a diagram of an example optical node 200 capable of achieving CDC add/drop using a single layer of M×N WSSs. As shown in FIG. 2, optical node 200 may include pairs of M×N WSSs 205 and 250, where each M×N WSS 205 and 250 includes a device capable of independently routing any wavelength channel from any inbound port to any outbound port of the device, or to a subset of outbound ports of the device, as described in further detail below.

In some implementations, each pair of M×N WSSs 205/250 is associated with a different degree of optical node 200. Optical node 200 includes a total of D degrees (D>2), where each of the D degrees includes an inbound M×N WSS 205 and an outbound M×N WSS 250 (M≥D, N≥2D). For example, as shown in FIG. 2, a degree D1 may include inbound M×N WSS 205-1 and outbound M×N WSS 250-1, and degree D2 may include inbound M×N WSS 205-2 and outbound M×N WSS 250-2. In some implementations, inbound M×N WSS 205 and outbound M×N WSS 250, associated with a given degree may be included in a "twin" WSS, where the inbound M×N WSS 205 and the outbound M×N WSS 250 are optically independent WSSs arranged in a same physical space and perhaps sharing some optical components.

Notably, while FIG. 2 shows only two degrees (D1 and D2) and the associated M×N WSSs 205/250, optical node 200 may include one or more additional degrees (each with respective inbound and outbound M×N WSSs 205 and 250). For example, while only two degrees are shown in FIG. 2, the M×N WSSs 205/250 shown in FIG. 2 are capable of supporting an optical node 200 including four degrees (e.g., D1 through D4).

As shown in FIG. 2, an inbound M×N WSS 205 may include an input port 305, a set of common inputs (CI) 310, a set of local drop ports 325, a set of drop outputs (DO) 330, and a set of express outputs (EO) 335.

Input port 305 (e.g., input port 305-1 of M×N WSS 205-1, input port 305-2 of M×N WSS 205-2) is a port of an inbound M×N WSS 205 via which the inbound M×N WSS 205 can receive (e.g., from another optical node) an input signal, associated with a respective degree, via an optical fiber. In some implementations, as shown in FIG. 2, one of the M ports 302 (as identified in FIG. 3A) of an inbound M×N WSS 205 is configured as input port 305. For example, one of the M ports 302 of M×N WSS 205-1 (one of the ports shown on the left side of M×N WSS 205-1 in FIG. 2) is configured as input port 305-1 via which M×N WSS 205-1 can receive an input signal, associated with degree D1, via an optical fiber. As another example, one of the M ports 302 of M×N WSS 205-2 (one of the ports shown on the right side of M×N WSS 205-2 in FIG. 2) is configured as input port 305-2 via which M×N WSS 205-2 can receive an input signal, associated with degree D2, via an optical fiber. While not shown, additional inbound M×N WSSs 205, associated with degrees D3 and D4, may be similarly configured with input ports 305.

In some implementations, input port 305 of an inbound M×N WSS 205 is configured such that an optical signal can be routed from input port 305 to any local drop port 325 of the inbound M×N WSS 205. For example, input port 305-1 may be configured such that an optical signal, received at input port 305-1, can be routed to any of the set of local drop ports 325-1. As another example, input port 305-2 of M×N WSS 205-2 may be configured such that an optical signal, received at input port 305-2, can be routed to any of the set of local drop ports 325-2. Additional details regarding local drop ports 325 are described below.

In some implementations, input port 305 of an inbound M×N WSS 205 is configured such that an optical signal can be routed from input port 305 to any drop output 330 of the inbound M×N WSS 205 (i.e., when the optical signal is to be dropped at a local drop port of another WSS 205). For example, M×N WSS 205-1 may be configured such that an optical signal, received at input port 305-1, can be routed to any of the set of drop outputs 330-1. As another example, input port 305-2 of M×N WSS 205-2 may be configured such that an optical signal, received at input port 305-2, can be routed to any of the set of drop outputs 330-2. Additional details regarding drop outputs 330 are described below.

In some implementations, input port 305 of an inbound M×N WSS 205 is configured such that an optical signal can be routed from input port 305 to any express output 335 of the inbound M×N WSS 205 (i.e., when the optical signal is to be provided via another degree). For example, input port 305-1 may be configured such that an optical signal, received at input port 305-1, can be routed to any of the set of express outputs 335-1. As another example, input port 305-2 of M×N WSS 205-2 may be configured such that an optical signal, received at input port 305-2, can be routed to any of the set of express outputs 335-2. Additional details regarding express outputs 335 are described below.

A set of common inputs 310 (e.g., identified as CI 310-1 for M×N WSS 205-1 and CI 310-2 for M×N WSS 205-2) is a set of inputs of an inbound M×N WSS 205 for receiving optical signals to be dropped at a degree associated with the inbound M×N WSS 205 (i.e., dropped at a local drop port 325 of the inbound M×N WSS 205). In some implementations, as shown in FIG. 2, a subset of the M ports 302 of an inbound M×N WSS 205 is configured as the set of common inputs 310. In some implementations, the set of common inputs 310 is connected to drop outputs 330 of other inbound M×N WSSs 205 associated with other degrees. In some implementations, the set of common inputs 310 includes D−1 inputs.

For example, a subset of the M ports 302 of M×N WSS 205-1 (e.g., three of the ports shown on the left side of M×N WSS 205-1 in FIG. 2) are configured as common inputs 310-1 via which M×N WSS 205-1 can receive optical signals to be dropped at degree D1 (i.e., at local drop ports 325-1 of M×N WSS 205-1). As shown, a common input 310-1 is connected to a drop output 330-2 of inbound M×N WSS 205-2 associated with degree D2. While not shown, the other common inputs 310-1 are connected to drop outputs 330 of inbound M×N WSSs 205 associated with degrees D3 and D4.

As another example, a subset of the M ports 302 of M×N WSS 205-2 (e.g., three of the ports shown on the right side of M×N WSS 205-2 in FIG. 2) are configured as common inputs 310-2 via which M×N WSS 205-2 can receive optical signals to be dropped at degree D2 (i.e., at local drop ports 325-2 of M×N WSS 205-2). As shown, a common input 310-2 is connected to a drop output 330-1 of inbound M×N WSS 205-1 associated with degree D1. While not shown, the other common inputs 310-2 are connected to drop outputs 330 of inbound M×N WSSs 205 associated with degrees D3 and D4.

In some implementations, the set of common inputs 310 of an inbound M×N WSS 205 is configured such that an optical signal can be routed from any common input 310 of the inbound M×N WSS 205 to any local drop port 325 of the inbound M×N WSS 205. For example, each common input 310-1 of M×N WSS 205-1 may be configured such that an optical signal, received at any of the set of common inputs 310-1, can be routed to any of the set of local drop ports 325-1. As another example, each common input 310-2 of M×N WSS 205-2 may be configured such that an optical signal, received at any of the set of common inputs 310-2, can be routed to any of the set of local drop ports 325-2.

A set of local drop ports 325 (e.g., local drop ports 325-1 of M×N WSS 205-1, local drop ports 325-2 of M×N WSS 205-2) is a set of ports via which optical signals may be dropped at a given degree (e.g., provided to optical receivers at the given degree). In some implementations, a subset of the N ports 322 (as identified in FIG. 3A) of an inbound M×N WSS 205 is configured as the set of local drop ports 325. For example, local drop ports 325-1 of inbound M×N WSS 205-1 may include a set of ports, of the N ports 322 of M×N WSS 205-1, via which optical signals can be dropped at D1. As another example, local drop ports 325-2 of inbound M×N WSS 205-2 may include a set of ports, of the N ports 322 of M×N WSS 205-2, via which optical signals can be dropped at D2. In some implementations, the set of local drop ports may include N−2D+2 drop ports. In some implementations, an optical signal can be routed to any local drop port 325 from input port 305 and/or from any common input 310, as described above.

A set of drop outputs 330 (e.g., identified as DO 330-1 for M×N WSS 205-1 and DO 330-2 for M×N WSS 205-2) is a set of outputs of an inbound M×N WSS 205 for providing optical signals to be dropped at local drop ports 325 of other inbound M×N WSSs 205. In some implementations, a subset of the N ports 322 of an inbound M×N WSS 205 is configured as the set of drop outputs 330. In some implementations, the set of drop outputs 330 is connected to common inputs 310 of other inbound M×N WSSs 205 associated with other degrees. In some implementations, the set of drop outputs 330 includes D−1 outputs.

For example, a subset of the N ports 322 of M×N WSS 205-1 (e.g., three of the ports shown on the right side of M×N WSS 205-1 in FIG. 2) are configured as drop outputs 330-1 via which M×N WSS 205-1 can provide optical signals to be dropped at other degrees (i.e., at local drop ports 325-2 of inbound M×N WSS 205-2). As shown, a drop output 330-1 is connected to a common input 310-2 of inbound M×N WSS 205-2 associated with degree D2. While not shown, the other drop outputs 330-1 are connected to common inputs 310 of inbound M×N WSSs 205 associated with degrees D3 and D4.

As another example, a subset of the N ports 322 of M×N WSS 205-2 (e.g., three of the ports shown on the right side of M×N WSS 205-2 in FIG. 2) are configured as drop outputs 330-2 via which M×N WSS 205-2 can provide optical signals to be dropped at other degrees (i.e., at local drop ports 325-1 of inbound M×N WSS 205-1). As shown, a drop output 330-2 is connected to a common input 310-1 of inbound M×N WSS 205-1 associated with degree D1. While not shown, the other drop outputs 330-2 are connected to common inputs 310 of inbound M×N WSSs 205 associated with degrees D3 and D4.

In some implementations, the set of drop outputs 330 of an inbound M×N WSS 205 is configured such that an optical signal can be routed from input port 305 of the inbound M×N WSS 205 to any drop output 330 of the inbound M×N WSS 205. For example, each drop output 330-1 of M×N WSS 205-1 may be configured such that an optical signal, received at input port 305-1, can be routed to any of the set of drop outputs 330-1. As another example, each drop output 330-2 of M×N WSS 205-2 may be configured such that an optical signal, received at input port 305-2, can be routed to any of the set of drop outputs 330-2.

A set of express outputs 335 (e.g., identified as EO 335-1 for M×N WSS 205-1 and EO 335-2 for M×N WSS 205-2) is a set of outputs of an inbound M×N WSS 205 for providing optical signals to be transmitted through optical node 200 (i.e., optical signals that are not to be dropped at optical node 200). In some implementations, a subset of the N ports 322 of an inbound M×N WSS 205 is configured as the set of express outputs 335. In some implementations, the set of express outputs 335 is connected to express inputs 385 of outbound M×N WSSs 250 associated with other degrees. In some implementations, the set of express outputs 335 includes D−1 outputs. Additional details regarding express inputs 385 are described below.

For example, a subset of the N ports 322 of M×N WSS 205-1 (e.g., three of the ports shown on the right side of M×N WSS 205-1 in FIG. 2) are configured as express outputs 335-1 via which M×N WSS 205-1 can provide optical signals that are to pass through optical node 200 and be transmitted at other degrees (i.e., via respective output ports 355). As shown, an express output 335-1 is connected to an express input 385-2 of outbound M×N WSS 250-2 associated with degree D2. While not shown, the other express outputs 335-1 are connected to express inputs 385 of outbound M×N WSSs 250 associated with degrees D3 and D4.

As another example, a subset of the N ports 322 of M×N WSS 205-2 (e.g., three of the ports shown on the left side of M×N WSS 205-2 in FIG. 2) are configured as express outputs 335-2 via which M×N WSS 205-2 can provide optical signals that are to pass through optical node 200 and be transmitted at other degrees (i.e., via respective output ports 355). As shown, an express output 335-2 is connected to an express input 385-1 of outbound M×N WSS 250-1 associated with degree D1. While not shown, the other express outputs 335-2 are connected to express inputs 385 of outbound M×N WSSs 250 associated with degrees D3 and D4.

In some implementations, the set of express outputs 335 of an inbound M×N WSS 205 is configured such that an optical signal can be routed from input port 305 of the inbound M×N WSS 205 to any express output 335 of the inbound M×N WSS 205. For example, the set of express outputs 335-1 of M×N WSS 205-1 may be configured such that an optical signal, received at input port 305-1, can be routed to any of the set of express outputs 335-1. As another example, the set of express outputs 335-2 of M×N WSS 205-2 may be configured such that an optical signal, received at input port 305-2, can be routed to any of the set of express outputs 335-2.

As further shown in FIG. 2, an outbound M×N WSS 250 may include an output port 355, a set of common outputs (CO) 360, a set of local add ports 375, a set of add inputs (AI) 380, and a set of express inputs (EI) 385.

Output port 355 (e.g., output port 355-1 of M×N WSS 250-1, output port 355-2 of M×N WSS 250-2) is a port of an outbound M×N WSS 250 via which the outbound M×N WSS 250 can provide (e.g., to another optical node) an output signal, associated with a respective degree, via an optical fiber. In some implementations, as shown in FIG. 2, one of the M ports 352 (as identified in FIG. 3B) of an outbound M×N WSS 250 is configured as output port 355. For example, one of the M ports 352 of M×N WSS 250-1 (one of the ports shown on the left side of M×N WSS 250-1 in FIG. 2) is configured as output port 355-1 via which M×N WSS 250-1 can provide an output signal, associated with degree D1, via an optical fiber. As another example, one of the M ports 352 of M×N WSS 250-2 (one of the ports shown on the right side of M×N WSS 250-2 in FIG. 2) is configured as output port 355-2 via which M×N WSS 250-2 can provide an output signal, associated with degree D2, via an optical fiber. While not shown, additional outbound M×N WSSs 250, associated with degrees D3 and D4, may be similarly configured with output ports 355.

In some implementations, output port 355 of an outbound M×N WSS 250 is configured such that an optical signal can be routed from any local add port 375 of the outbound M×N WSS 250 to output port 355 (i.e., when the optical signal is to be transmitted from the degree at which the optical signal is added). For example, output port 355-1 may be configured such that an optical signal can be routed from any of the set of local add ports 375-1 to output port 355-1 for transmission on an output optical fiber associated with degree D1. As another example, output port 355-2 may be configured such that an optical signal can be routed from any of the set of local add ports 375-2 to output port 355-2 for transmission on an output optical fiber associated with degree D2. Additional details regarding local add ports 375 are described below.

In some implementations, output port 355 of an outbound M×N WSS 250 is configured such that an optical signal can be routed from any add input 380 of the outbound M×N WSS 250 to output port 355 (e.g., when the optical signal is added at another degree and is to be provided via the degree associated with the outbound M×N WSS 250). For example, output port 355-1 may be configured such that an optical signal can be routed from any of the set of add inputs 380-1 to output port 355-1 for transmission on an output optical fiber associated with degree D1. As another example, output port 355-2 may be configured such that an optical signal can be routed from any of the set of add inputs 380-2 to output port 355-2 for transmission on an output optical fiber associated with degree D2. Additional details regarding add inputs 380 are described below.

In some implementations, output port 355 of an outbound M×N WSS 250 is configured such that an optical signal can be routed from any express input 385 of the outbound M×N WSS 250 to output port 355. For example, output port 355-1 may be configured such that an optical signal can be routed from any of the set of express inputs 385-1 to output port 355-1. As another example, output port 355-2 may be configured such that an optical signal can be routed from any of the set of express inputs 385-2 to output port 355-2. Additional details regarding express inputs 385 are described below.

A set of common outputs 360 (e.g., identified as CO 360-1 for M×N WSS 250-1 and CO 360-2 for M×N WSS 250-2) is a set of outputs of an outbound M×N WSS 250 for providing optical signals to be transmitted via outbound M×N WSSs 250 associated with other degrees (i.e., optical signals to be provided via output ports 355 associated with the other degrees). In some implementations, as shown in FIG. 2, a subset of the M ports 352 of an outbound M×N WSS 250 is configured as the set of common outputs 360. In some implementations, the set of common outputs 360 is connected to add inputs 380 of other outbound M×N WSSs 250 associated with other degrees. In some implementations, the set of common outputs 360 includes D−1 outputs.

For example, a subset of the M ports 352 of M×N WSS 250-1 (e.g., three of the ports shown on the left side of M×N WSS 250-1 in FIG. 2) are configured as common outputs 360-1 via which M×N WSS 250-1 can provide optical signals to be transmitted at degrees D2, D3, and/or D4. (i.e., via respective output ports 355 associated with each other degree). As shown, a common output 360-1 is connected to an add input 380-2 of outbound M×N WSS 250-2 associated with degree D2. While not shown, the other common outputs 360-1 are connected to add inputs 380 of outbound M×N WSSs 250 associated with degrees D3 and D4.

As another example, a subset of the M ports 352 of M×N WSS 250-2 (e.g., three of the ports shown on the right side of M×N WSS 250-2 in FIG. 2) are configured as common outputs 360-2 via which M×N WSS 250-2 can provide optical signals to be transmitted at degrees D1, D3, and/or D4 (i.e., via respective output ports 355 associated with each other degree). As shown, a common output 360-2 is connected to an add input 380-1 of outbound M×N WSS 250-1 associated with degree D1. While not shown, the other common outputs 360-2 are connected to add inputs 380 of outbound M×N WSSs 250 associated with degrees D3 and D4.

In some implementations, the set of common outputs 360 of an outbound M×N WSS 250 is configured such that an optical signal can be routed from any local add port 375 of the outbound M×N WSS 250 to any common output 360 of the outbound M×N WSS 250. For example, the set of common outputs 360-1 of M×N WSS 250-1 may be configured such that an optical signal can be routed from any of the set of local add ports 375-1 to any of the set of common outputs 360-1. As another example, the set of common outputs 360-2 of M×N WSS 250-2 may be configured such that an optical signal can be routed from any of the set of local add ports 375-2 to any of the set of common outputs 360-2.

A set of local add ports 375 (e.g., local add ports 375-1 of M×N WSS 250-1, local add ports 375-2 of M×N WSS 250-2) is a set of ports via which optical signals may be added (e.g., received from optical transmitters, to be sent to one of the output ports 355 of the optical node). In some implementations, a subset of the N ports 372 (as identified in FIG. 3B) of an outbound M×N WSS 250 is configured as the set of local add ports 375. For example, local add ports 375-1 of outbound M×N WSS 250-1 may include a set of ports, of the N ports 372 of M×N WSS 250-1, via which optical signals can be added at D1. As another example, local add ports 375-2 of outbound M×N WSS 250-2 may include a set of ports, of the N ports 372 of M×N WSS 250-2, via which optical signals can be added at D2. In some implementations, the set of local add ports may include N−2D+2 add ports. In some implementations, an optical signal can be routed from any local add port 375 to output port 355 and/or to any common output 360, as described above.

A set of add inputs 380 (e.g., identified as AI 380-1 for M×N WSS 250-1 and AI 380-2 for M×N WSS 250-2) is a set of inputs of an outbound M×N WSS 250 for receiving optical signals to be transmitted at the degree associated with the outbound M×N WSS 250 (i.e., to be provided on an optical fiber via output port 355 of the outbound M×N WSS 250). In some implementations, a subset of the N ports 372 of an outbound M×N WSS 250 is configured as the set of add inputs 380. In some implementations, the set of add inputs 380 is connected to common outputs 360 of other outbound M×N WSSs 250 associated with other degrees. In some implementations, the set of add inputs 380 includes D−1 outputs.

For example, a subset of the N ports 372 of M×N WSS 250-1 (e.g., three of the ports shown on the right side of M×N WSS 250-1 in FIG. 2) are configured as add inputs 380-1 via which M×N WSS 250-1 can receive optical signals to be transmitted at degree D1 (e.g., via output port 355-1). As shown, an add input 380-1 is connected to a common output 360-2 of outbound M×N WSS 250-2 associated with degree D2. While not shown, the other add inputs 380-1 are connected to common outputs 360 of outbound M×N WSSs 250 associated with degrees D3 and D4.

As another example, a subset of the N ports 372 of M×N WSS 250-2 (e.g., three of the ports shown on the right side of M×N WSS 250-2 in FIG. 2) are configured as add inputs 380-2 via which M×N WSS 250-2 can receive optical signals to be transmitted at degree D2 (e.g., via output port 355-2). As shown, an add input 380-2 is connected to a common output 360-1 of outbound M×N WSS 250-1 associated with degree D1. While not shown, the other add inputs 380-2 are connected to common outputs 360 of outbound M×N WSSs 250 associated with degrees D3 and D4.

In some implementations, the set of add inputs 380 of an outbound M×N WSS 250 is configured such that an optical signal can be routed from any add input 380 of the outbound M×N WSS 250 to output port 355 of the outbound M×N WSS 250. For example, each add input 380-1 of M×N WSS 250-1 may be configured such that an optical signal can be routed from any of the set of add inputs 380-1 to output port 355-1. As another example, each add input 380-2 of M×N WSS 250-2 may be configured such that an optical signal can be routed from any of the set of add inputs 380-2 to output port 355-2.

A set of express inputs 385 (e.g., identified as EI 385-1 for M×N WSS 250-1 and EI 385-2 for M×N WSS 250-2) is a set of inputs of an outbound M×N WSS 250 for receiving optical signals to be transmitted through optical node 200 (i.e., optical signals that are not to be dropped at optical node 200). In some implementations, a subset of the N ports 372 of an outbound M×N WSS 250 is configured as the set of express inputs 385. In some implementations, the set of express inputs 385 is connected to express outputs 335 of inbound M×N WSSs 205 associated with other degrees. In some implementations, the set of express inputs 385 includes D−1 inputs.

For example, a subset of the N ports 372 of M×N WSS 250-1 (e.g., three of the ports shown on the right side of M×N WSS 250-1 in FIG. 2) are configured as express inputs 385-1 via which M×N WSS 250-1 can receive optical signals that are to pass through optical node 200 and be transmitted at degree D1 (i.e., via output port 355-1). As shown, an express input 385-1 is connected to an express output 335-2 of inbound M×N WSS 205-2 associated with degree D2. While not shown, the other express inputs 385-1 are connected to express outputs 335 of inbound M×N WSSs 205 associated with degrees D3 and D4.

As another example, a subset of the N ports 372 of M×N WSS 250-2 (e.g., three of the ports shown on the left side of M×N WSS 250-2 in FIG. 2) are configured as express inputs 385-2 via which M×N WSS 250-2 can receive optical signals that are to pass through optical node 200 and be transmitted at degree D2 (i.e., via output port 355-2). As shown, an express input 385-2 is connected to an express output 335-1 of inbound M×N WSS 205-1 associated with degree D1. While not shown, the other express inputs 385-2 are connected to express outputs 335 of inbound M×N WSSs 205 associated with degrees D3 and D4.

In some implementations, the set of express inputs 385 of an outbound M×N WSS 250 is configured such that an optical signal can be routed from any express input 385 of the outbound M×N WSS 250 to output port 355 of the outbound M×N WSS 250. For example, the set to express inputs 385-1 of M×N WSS 250-1 may be configured such that an optical signal can be routed from any of the set of express inputs 385-1 to output port 355-1. As another example, the set of express inputs 385-2 of M×N WSS 250-2 may be configured such that an optical signal can be routed from any of the set of express inputs 385-2 to output port 355-2.

In this way, optical node 200 may be capable of achieving CDC functionality using a single layer of M×N WSSs 205. For example, any optical signal can be routed to any output fiber or can be dropped to any receiver, connected to any M×N WSS at optical node 200, with no wavelength contention (i.e., multiple instances of each wavelength can be independently routed). Further, any optical signal, provided by a transmitter of a given M×N WSS, can be routed to any output fiber with no wavelength contention.

In some implementations, routes within a given M×N WSS 205/250 of optical node 200 and/or connections between M×N WSSs 205/250 of optical node 200 may be configured and/or reconfigured by a controller associated with optical node 200 (not shown).

As illustrated by FIG. 2, some optical signal may pass through only one M×N WSS 205/250. For example, an optical signal received via input port 305-1 of M×N WSS 205-1 that is dropped at a local drop port 325-1 of M×N WSS 205-1 passes through only M×N WSS 205-1. However, other optical signals may pass through two M×N WSSs 205. For example, an optical signal received via input port 305-1 of M×N WSS 205-1 that is dropped at a local drop port 325-2 of M×N WSS 205-2 passes through M×N WSS 205-1 and M×N 205-2. Thus, these optical signals may experience different amounts of insertion loss. This could be compensated by adding attenuation for optical signals that pass through only one M×N WSS 205/250, so that a power level of all optical signals is approximately equal.

Further, optical signals provided via an express path may have high isolation. In other words, dropped wavelengths may be removed in order to avoid interference with optical signals of the same wavelength which are subsequently added. This may require selection of which ports to use as express outputs 335 and/or express inputs 385 in order to optimize isolation. In some cases, particular port positions may need to be left unused. For example, ports corresponding to the −1 order diffraction angle of each express output 335 and/or express input 385, or other port positions that may cause crosstalk into the express output 335 and/or express input 385, may need to be left unused. In some implementations, insertion loss may be low enough that optical amplifiers are not needed between M×N WSSs 205/250.

The number and arrangement of elements shown and described in association with FIG. 2 are provided as examples. In practice, optical node 200 may include additional degrees and/or WSSs 205/250, fewer degrees and/or WSSs 205/250, different degrees and/or WSSs 205/250, differently arranged degrees and/or WSSs 205/250, and/or differently sized WSSs than those shown in FIG. 2.

In an example operation of optical node 200, M×N WSS 205-1 receives an input signal (e.g., an optical signal including one or more wavelength channels) at degree D1 via input port 305-1. Here, if a wavelength channel of the input signal is to be dropped at a particular local drop port 325 of degree D1 (e.g., one of the set of local drop ports 325-1), then M×N WSS 205-1 may selectively route an optical signal, including the wavelength channel, to the particular local drop port 325 of the set of local drop ports 325-1 (e.g., such that the wavelength channel is provided to an optical receiver associated with the particular local drop port 325).

In another example operation of optical node 200, M×N WSS 205-1 receives an input signal at degree D1 via input port 305-1. Here, if a wavelength channel of the input signal is to be dropped at a local drop port 325 of degree D2 (e.g., one of the set of local drop ports 325-2), then M×N WSS 250-1 may selectively route an optical signal, including the wavelength channel, to a drop output 330-1 that connects to a common input 310-2 of M×N WSS 205-2. In this example, M×N WSS 205-2 may receive the optical signal via the common input 310-2, and route the optical signal to the particular local drop port 325 of the set of local drop ports 325-2.

In yet another example operation of optical node 200, M×N WSS 205-1 receives an input signal at degree D1 via input port 305-1. Here, if a wavelength channel of the input signal is to pass through optical node 200 (i.e., is to be provided in a direction associated with degree D2), then M×N WSS 250-1 may selectively route an optical signal, including the wavelength channel, to an express output 335-2 of M×N WSS 205-1 that connects to an express input 385-2 of M×N WSS 250-2. In this example, M×N WSS 250-2 may receive the optical signal via the express input 385-2, and route the optical signal, including the wavelength channel, to output port 355-2 for output in the direction associated with degree D2.

In still another example operation of optical node 200, M×N WSS 250-1 receives an optical signal (e.g., an optical signal including a wavelength channel) added at degree D1 via a local add port 375-1 (e.g., an optical signal provided by an optical receiver connected to the local add port 375-1). Here, if the wavelength channel is to be provided in a direction associated with degree D1, then M×N WSS 250-1 may selectively route the optical signal, including the wavelength channel, to output port 355-1 for output in the direction associated with degree D1.

As an additional example operation of optical node 200, M×N WSS 250-1 receives an optical signal (e.g., an optical signal including a wavelength channel) added at degree D1 via a local add port 375-1. Here, if the wavelength channel is to be provided in a direction associated with degree D2, then M×N WSS 250-1 may selectively route an optical signal, including the wavelength channel, to a common output 360-1 that connects to an add input 380-2 of M×N WSS 250-2. In this example, M×N WSS 250-2 may receive the optical signal via the add input 380-2, and route the optical signal to output port 355-2 for output in the direction associated with degree D2.

When configured in the manner described herein, optical node 200 possesses so-called "east-west separability," meaning that if any one M×N WSS 205/250 fails, the failure affects optical signals travelling in one direction only. In such a case, affected optical signals may be routed via alternate routes (in other directions) in order to reach their intended destinations.

The example operations of optical node 200 are provided for illustrative purposes, and other examples are possible. For example, optical node 200 may operate in a similar manner as described above in a case where an input signal is received via input port 305-2. Additionally, while degrees D3 and D4 are not described in the above example operations, optical node 200 may operate in a similar manner when routing optical signals received at and/or provided via degrees D3 and/or D4.

Figure 3A:
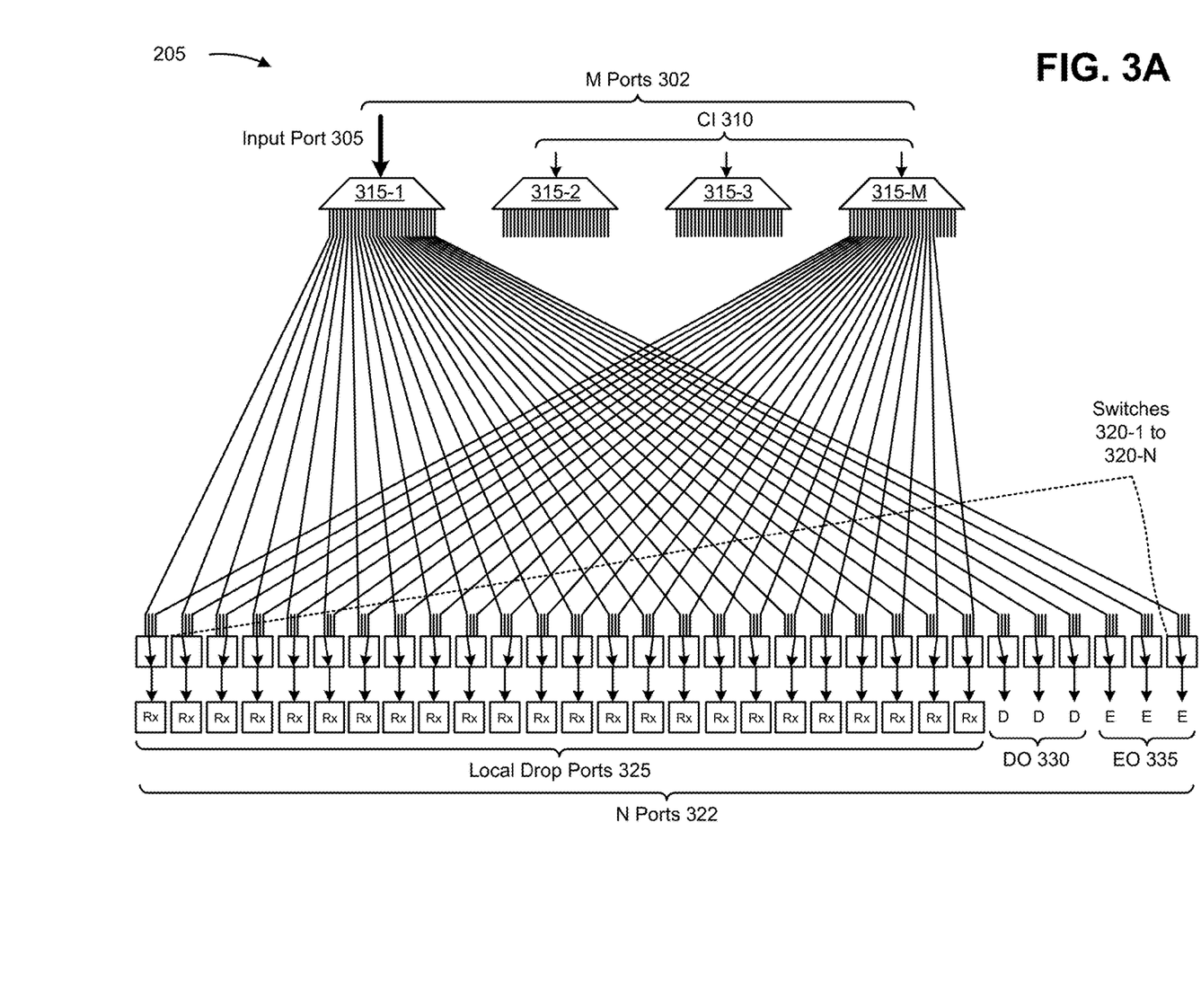
FIGS. 3A and 3B are example functional diagrams of an inbound M×N WSS and an outbound M×N WSS, respectively, included in the example optical node of FIG. 2.
Figure 3B:
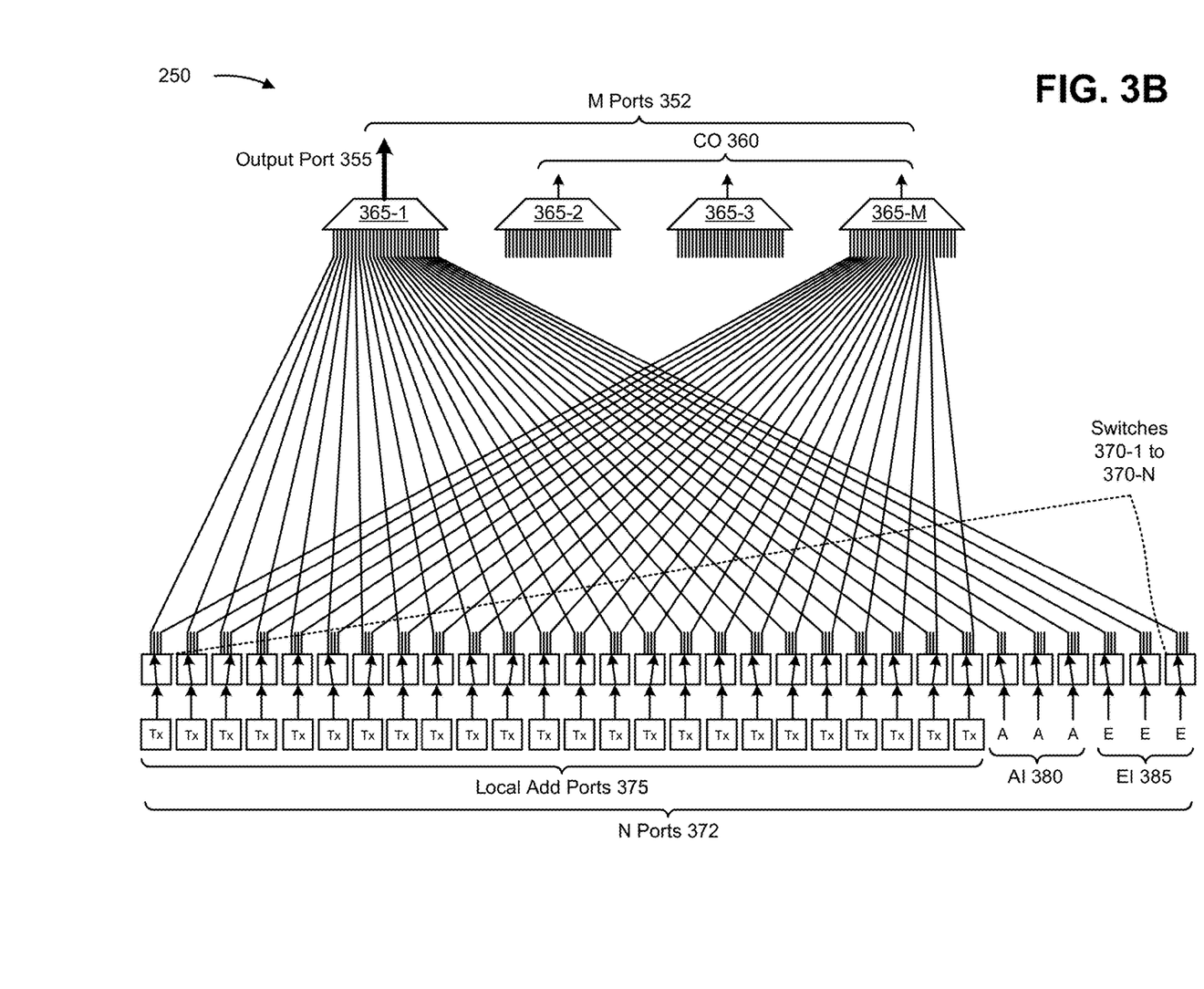

FIGS. 3A and 3B are example functional diagrams of an inbound M×N WSS 205 and an outbound M×N WSS 250, respectively, of optical node 200. As shown in FIG. 3A, and as described above, an inbound M×N WSS 205 (e.g., M×N WSS 205-1, M×N WSS 205-2) may include a set of M ports 302 including an input port 305 and a set of common inputs 310, and a set of N ports 322 including a set of local drop ports 325 (e.g., shown as being connected to a corresponding set of optical receivers (RX)), a set of drop outputs 330, and a set of express outputs 335.

As further shown in FIG. 3A, the inbound M×N WSS 205 may include one or more elements that provide functionality of a set of M 1×N WSSs 315 (e.g., identified as 315-1 through 315-M in FIG. 3A) and one or more elements that provide functionality of a set of N optical switches 320 (e.g., identified as switches 320-1 through 320-N in FIG. 3A).

1×N WSS 315 includes an element capable of selectively routing optical signals, received at an input of 1×N WSS 315, with each wavelength channel being independently routed. For example, as shown in FIG. 3A, 1×N WSS 315-1 includes an element capable of selectively routing optical signals, received via input port 305, to any of the set of local drop ports 325, any of the set of drop outputs 330, and any of the set of express outputs 335 (e.g., via corresponding optical switches 320), with wavelength channels being independently routed.

As another example, 1×N WSSs 315-2 through 315-M include elements capable of selectively routing optical signals, received via common inputs 310, to any of the set of local drop ports 325 (e.g., via corresponding optical switches 320), with each wavelength channel being independently routed. In some implementations, as shown in FIG. 3A, 1×N WSSs 315-2 through 315-M need not be capable of routing optical signals, received via their respective common inputs 310, to any of the set of drop outputs 330 or any of the set of express outputs 335 (e.g., since optical signals received via common inputs 310 include only optical signals to be dropped at that particular inbound M×N WSS 205).

Notably, while the inbound M×N WSS 205 is shown as including M individual 1×N WSSs 315, the inbound M×N WSS 205 may not include M distinct or identifiable 1×N WSSs 315. Rather, inbound M×N WSS 205 may include one or more elements that provide functionality equivalent to M individual 1×N WSSs 315. For example, in some implementations, the set of 1×N WSSs 315 may be implemented using different sub-regions of a liquid crystal on silicon (LCOS) steering element. As another example, in some implementations, inbound M×N WSS 205 may include a 1×N WSS and (D−1) 1×(N−2D+2) WSSs.

Optical switch 320 includes an element capable of selecting a 1×N WSS 315 from which optical signals are to be received by an output of the inbound M×N WSS 205. For example, as shown in FIG. 3A, an optical switch 320, associated with a given local drop port 325, may select one of 1×N WSS 315-1 through 1×N WSS 315-M from which optical signals are to be received (and provided to the given local drop port 325). As shown, each optical switch 320 is associated with a different one of the set of local drop ports 325, the set of drop outputs 330, and the set of express outputs 335.

In some implementations, as shown in FIG. 3A, the inbound M×N WSS 205 may include optical switches 320 associated with the set of drop outputs 330 and the set of express outputs 335 (even though the set of drop outputs 330 and the set of express outputs 335 need to receive optical signals from 1×N WSS 315-1 only) in order to support reconfiguration of the inbound M×N WSS 205 at a later time. For example, the inbound M×N WSS 205 may include optical switches 320 at every output in order to support reconfiguration of a drop output 330 or an express output 335 as a local drop port 325. Alternatively, the inbound M×N WSS may include fewer than N optical switches.

Notably, while the inbound M×N WSS 205 is shown as including N individual optical switches 320, the inbound M×N WSS 205 may not include distinct or identifiable optical switches 320. Rather, inbound M×N WSS 205 may include one or more elements that provide functionality equivalent to N optical switches. For example, in some implementations, the set of optical switches 320 may be implemented using an array of microelectromechanical systems (MEMS) mirrors, where each mirror of the MEMS array functions as an optical switch for a respective output of the inbound M×N WSS 205. In some implementations, the inbound M×N WSS 205 may include N−2D+2 optical switches 320.

As shown in FIG. 3B, and as described above, an outbound M×N WSS 250 (e.g., M×N WSS 250-1, M×N WSS 250-2) may include a set of M ports 352 including an output port 355 and a set of common outputs 360, and a set of N ports 372 including a set of local drop ports 375 (e.g., shown as being connected to a corresponding set of optical transmitters (TX)), a set of add inputs 380, and a set of express inputs 385.

As further shown in FIG. 3B, the outbound M×N WSS 250 may include one or more elements that provide functionality of a set of M 1×N WSSs 365 (e.g., identified as 365-1 through 365-M in FIG. 3B) and one or more elements that provide functionality of a set of N optical switches 370 (e.g., identified as switches 370-1 through 370-N in FIG. 3B).

1×N WSS 365 includes an element capable of receiving optical signals (e.g., multiple wavelength channels) at inputs of 1×N WSS 365, and providing the optical signals via an output of 1×N WSS 365. For example, as shown in FIG. 3B, 1×N WSS 365-1 includes an element capable of receiving optical signals from any of the set of local add ports 375, any of the set of add inputs 380, and any of the set of express inputs 385 (e.g., via corresponding optical switches 320), and providing the optical signals via output port 355.

As another example, 1×N WSSs 365-2 through 365-M include elements capable of receiving optical signals from any of the set of local add ports 375 (e.g., via corresponding optical switches 320), and providing the optical signals via respective common outputs 360. In some implementations, as shown in FIG. 3B, 1×N WSSs 365-2 through 365-M need not be capable of receiving optical signals from any of the set of add inputs 380 or any of the set of express inputs 385 (e.g., since optical signals received via add inputs 380 and express inputs 385 include only optical signals to be output by the degree of the outbound M×N WSS 250).

Notably, while the outbound M×N WSS 250 is shown as including M individual 1×N WSSs 365, the outbound M×N WSS 250 may not include M distinct or identifiable 1×N WSSs 365. Rather, outbound M×N WSS 250 may include one or more elements that provide functionality equivalent to M individual 1×N WSSs 365. For example, in some implementations, the set of 1×N WSSs 365 may be implemented using different sub-regions of an LCOS steering element. As another example, in some implementations, outbound M×N WSS 250 may include a 1×N WSS and (D−1) 1×(M−2D+2) WSSs.

Optical switch 370 includes an element capable of selecting a 1×N WSS 365 to which optical signals, provided by an input of the outbound M×N WSS 250, are to be provided. For example, as shown in FIG. 3B, an optical switch 370, associated with a given local add port 375, may select one of 1×N WSS 365-1 through 1×N WSS 365-M to which optical signals are to be provided. As shown, each optical switch 370 is associated with a different one of the set of local add ports 375, the set of add inputs 380, and the set of express inputs 385.

In some implementations, as shown in FIG. 3B, the outbound M×N WSS 250 may include optical switches 370 associated with the set of add inputs 380 and the set of express inputs 385 (even though the set of add inputs 380 and the set of express inputs 385 need to provide optical signals to 1×N WSS 365-1 only) in order to support reconfiguration of the outbound M×N WSS 205 at a later time. For example, the outbound M×N WSS 250 may include optical switches 370 at every input in order to support reconfiguration of an add input 380 or an express input 385 as a local add port 375. Alternatively, the outbound M×N WSS 250 may include fewer than N optical switches.

Notably, while the outbound M×N WSS 250 is shown as including N individual optical switches 370, the outbound M×N WSS 250 may not include distinct or identifiable optical switches 370. Rather, outbound M×N WSS 250 may include one or more elements that provide functionality equivalent to N optical switches. For example, in some implementations, the set of optical switches 370 may be implemented using an array of MEMS mirrors, where each mirror of the MEMS array functions as an optical switch for a respective input of the outbound M×N WSS 250. In some implementations, the outbound M×N WSS 250 may include N−2D+2 optical switches 320.

In some implementations, a given M×N WSS can function as either an inbound M×N WSS 205 or an outbound M×N WSS 250. In other words, an inbound M×N WSS 205 and an outbound M×N WSS 250 may include similar elements (e.g., 1×N WSSs 315 may be the same as 1×N WSSs 365 and optical switches 320 may be the same as optical switches 370), and operation as an inbound M×N WSS 205 or an outbound M×N WSS 250 depends on a direction in which optical signals are to be routed via the M×N WSS.

In some implementations, the cost, the complexity, and/or the size of optical node 200 may be reduced by using an add/drop type of M×N WSS, where each of the N ports of the M×N WSS is capable of being connected to a single port of the M ports at a given time, rather than using a fully flexible, and more complex, wavelength cross-connect (WXC) that is capable of routing different wavelength optical signals from a single N port to different M ports.

The number and arrangement of elements shown in FIGS. 3A and 3B are provided as examples. In practice, one or more M×N WSSs 205/250 of optical node 200 may include additional elements, fewer elements, different elements, differently arranged elements, and/or differently sized elements than those shown in FIGS. 3A and 3B. Additionally, or alternatively, a set of elements (e.g., one or more elements) of one or more M×N WSSs 205/250 of optical node 200 may perform one or more functions described as being performed by another set of elements of the one or more M×N WSSs 205/250 of optical node 200.

Figure 4A:
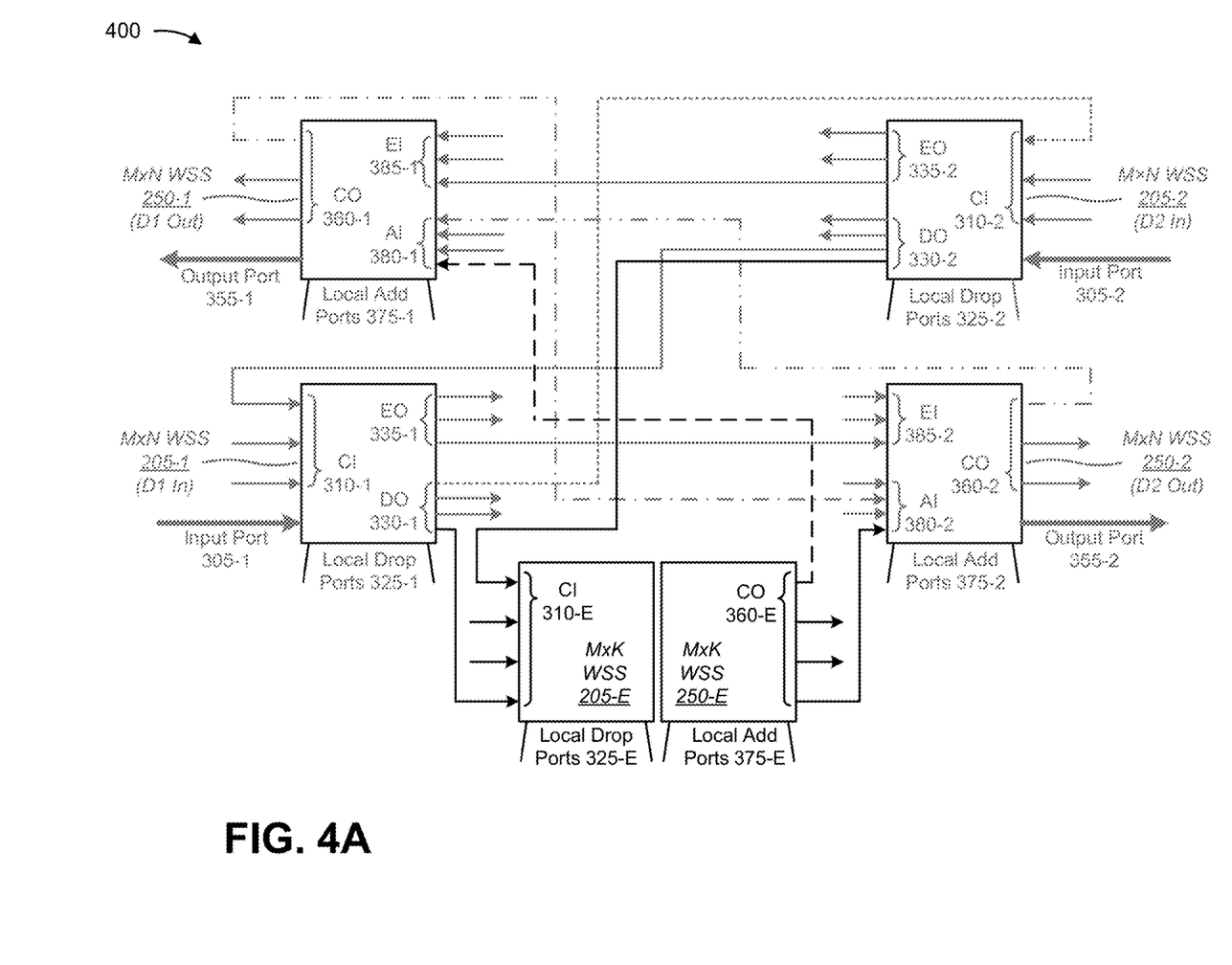
FIGS. 4A and 4B are diagrams of example optical nodes capable of achieving CDC add/drop using a single layer of M×N WSSs, while providing add/drop port expansion.
Figure 4B:
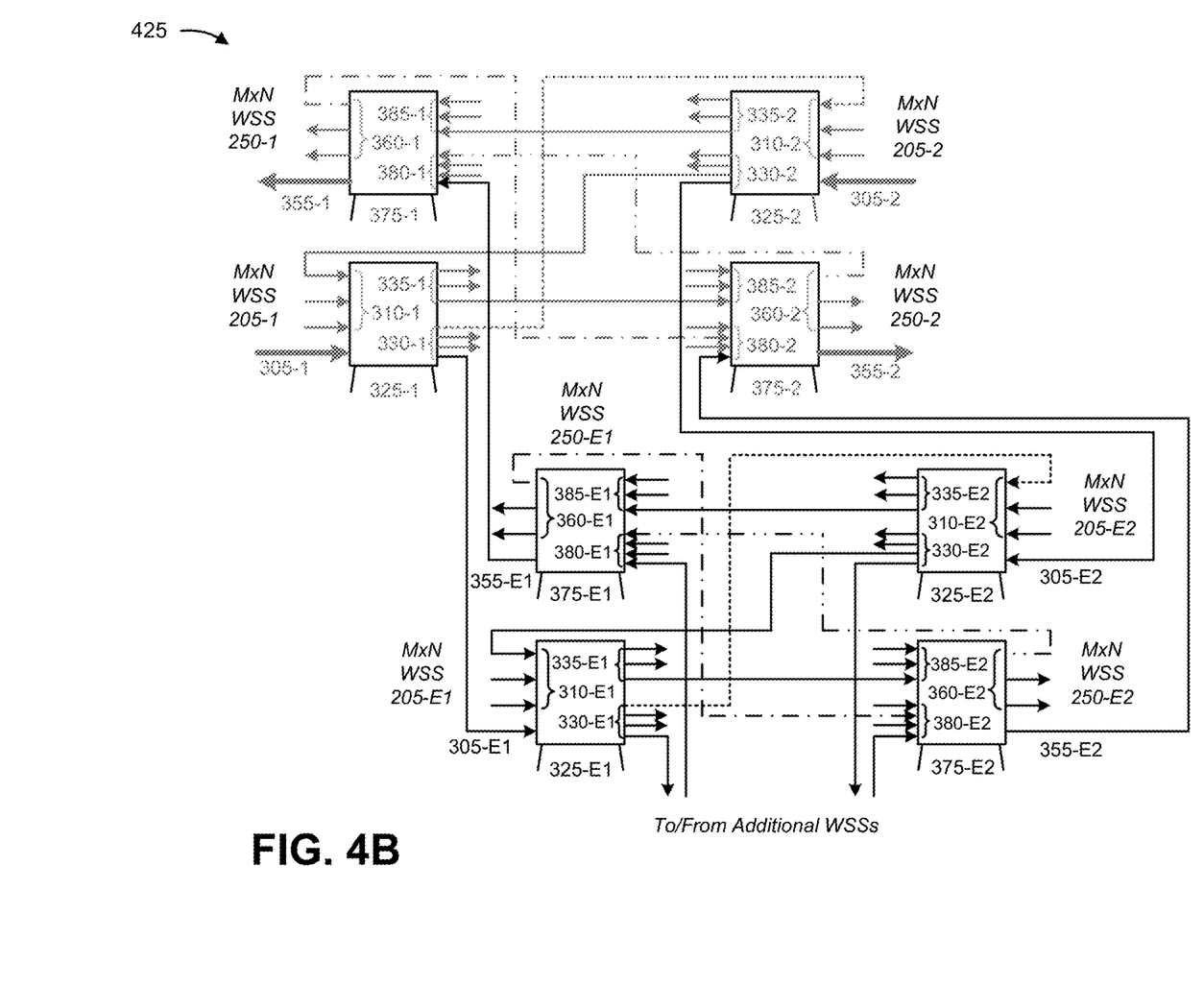

FIGS. 4A and 4B are diagrams of example optical nodes 400 and 425, respectively, that achieve CDC add/drop using a group of M×N WSSs 205/250 with add/drop port expansion.

FIG. 4A is a diagram of an example optical node 400 that includes a layer of add/drop port expansion. As shown in FIG. 4A, optical node 400 may include pairs of inbound and outbound M×N WSSs 205/250 (e.g., including M×N WSS 205-1, M×N WSS 250-1, M×N WSS 205-2, and M×N WSS 250-2), where each pair of inbound and outbound M×N WSSs 205/250 is associated with a different degree (e.g., including degrees D1 and D2), as described above with regard to optical node 200.

As further shown, optical node 400 may further include an expansion inbound M×K WSS 205 (K≥1) (e.g., identified as M×K WSS 205-E in FIG. 4A) and/or an expansion outbound M×K WSS 250 (e.g., identified as M×K 250-E in FIG. 4A). An expansion inbound M×K WSS 205 is a WSS that supports drop port expansion of optical node 400 by providing additional local drop ports (e.g., in addition to those of inbound M×N WSSs 205) at which optical signals may be dropped. An expansion outbound M×K WSS 250 is a WSS that supports add port expansion of optical node 400 by providing additional local add ports (e.g., in addition to those of outbound M×N WSSs 250) at which optical signals may be added.

In some implementations, the M ports 302 of expansion inbound M×K WSS 205-E may include a set of D common inputs 310-E, where each common input 310-E is connected to a drop output 330 of an inbound M×N WSS 205 associated with a respective degree. For example, as shown in FIG. 4A, a first common input 310-E of expansion inbound M×K 205-E may be connected to a drop output 330-1 of inbound M×N 205-1 associated with degree D1. As another example, a second common input 310-E of expansion inbound M×K 205-E may be connected to a drop output 330-2 of inbound M×N 205-2 associated with degree D2. While not shown, other common inputs 310-E of expansion inbound M×K WSS 205-E may be connected to drop outputs 330 of inbound M×N WSSs 205 associated with degrees D3 and D4. In some implementations, the set of common inputs 310-E includes D inputs.

Here, expansion inbound M×K WSS 205-E provides K additional local drop ports (e.g., identified as local drop ports 325-E) at which optical signals, provided via common inputs 310-E, may be dropped. In order to support drop port expansion as shown in FIG. 4A, N should be greater than or equal to 2D+1 for each inbound M×N WSS 205 connected to expansion inbound M×K WSS 205-E.

In some implementations, the M ports 352 of expansion outbound M×K WSS 250-E may include a set of D common outputs 360-E, where each common output 360-E is connected to an add input 380 of an outbound M×N WSS 250 associated with a respective degree. For example, as shown in FIG. 4A, a first common output 360-E of expansion outbound M×K 250-E may be connected to an add input 380-1 of outbound M×N 250-1 associated with degree D1. As another example, a second common output 360-E of expansion outbound M×K WSS 250-E may be connected to an add input 380-2 of outbound M×N 250-2 associated with degree D2. While not shown, other common outputs 360-E of expansion outbound M×K WSS 250-E may be connected to add inputs 380 of outbound M×N WSSs 250 associated with degrees D3 and D4. In some implementations, the set of common outputs 360-E includes D outputs.

Here, expansion outbound M×K WSS 250-E provides K additional local add ports (e.g., identified as local add ports 375-E) at which optical signals may be added at optical node 400, and provided via common outputs 360-E. In order to support add port expansion as shown in FIG. 4A, N should be greater than or equal to 2D+1 for each outbound M×N WSS 250 connected to expansion outbound M×K WSS 250-E.

FIG. 4B is a diagram of an example optical node 425 that includes cascaded layers of add/drop port expansion. As shown in FIG. 4B, optical node 425 may include pairs of inbound and outbound M×N WSSs 205/250 (e.g., including M×N WSSs 205-1, 250-1, 205-2, and 250-2), where each pair of inbound and outbound M×N WSSs 205/250 is associated with a different degree (e.g., including degrees D1 and D2), as described above with regard to optical node 200.

As further shown, optical node 425 may further include a layer of expansion M×N WSSs 205/250 (e.g., identified as M×N WSSs 205-E1, 250-E1, 205-E2, and 250-E2, in FIG. 4B). Here, each degree of optical node 425 may have an associated expansion inbound M×N WSS 205 and an associated expansion outbound M×N WSS 250. The expansion inbound/outbound M×N WSSs 205/250 support add/drop port expansion of optical node 425 by providing additional local add/drop ports (e.g., in addition to those of M×N WSSs 205-1, 250-1, 205-2, and 250-2) at which optical signals may be added/dropped.

In some implementations, a drop output 330 of an inbound M×N WSS 205 is connected to an input port 305 of an expansion inbound M×N WSS 205. For example, as shown in FIG. 4B, a drop output 330-1 of inbound M×N WSS 205-1 may be connected to an input port 305-E1 of expansion inbound M×N 205-E1 associated with degree D1. As another example, a drop output 330-2 of inbound M×N WSS 205-2 may be connected to an input port 305-E2 of expansion inbound M×N 205-E2 associated with degree D2. While not shown, drop outputs 330 of inbound M×N WSSs 205, associated with degrees D3 and D4, may be similarly connected to input ports 305 of expansion inbound M×N WSSs 205 associated with degrees D3 and D4.

In some implementations, an add input 380 of an outbound M×N WSS 250 is connected to an output port 355 of an expansion outbound M×N WSS 250. For example, as shown in FIG. 4B, an add input 380-1 of outbound M×N WSS 250-1 may be connected to an output port 355-E1 of expansion outbound M×N 250-E1 associated with degree D1. As another example, an add input 380-2 of outbound M×N WSS 250-2 may be connected to an output port 355-E2 of expansion outbound M×N 250-E2 associated with degree D2. While not shown, add inputs 380 of outbound M×N WSSs 250, associated with degrees D3 and D4, may be similarly connected to output ports 355 of expansion outbound M×N WSSs 250 associated with degrees D3 and D4.

As further shown in FIG. 4B, connections between M×N WSSs 205-E1, 250-E1, 205-E2, and 250-E2 may be similar to connections between M×N WSSs 205-1, 250-1, 205-2, and 250-2, as described above with regard to FIG. 2. In order to support drop port expansion as shown in FIG. 4B, N should be greater than or equal to 2D+1 for each M×N WSS 205/250.

At optical node 425, expansion inbound M×N WSS 205-E1 provides N−2D+1 additional local drop ports (e.g., identified as local drop ports 325-E1) via which optical signals may be dropped at degree D1, and expansion inbound M×N WSS 205-E2 provides N−2D+1 additional local drop ports (e.g., identified as local drop ports 325-E2) via which optical signals may be dropped at degree D2. Similarly, expansion outbound M×N WSS 250-E1 provides N−2D+1 additional local add ports (e.g., identified as local add ports 375-E1) via which optical signals may be added at degree D1, and expansion outbound M×N WSS 250-E2 provides N−2D+1 additional local add ports (e.g., identified as local add ports 375-E2) via which optical signals may be added at degree D2. While not shown, expansion inbound M×N WSSs 205 and expansion outbound M×N WSSs 250, associated with degrees D3 and D4, may provide similar add/drop expansion.

As noted in FIG. 4B, additional expansion inbound/expansion outbound M×N WSSs 205/250 may be added to optical node 425 (e.g., by connecting drop outputs 330 of expansion inbound M×N WSSs 205 to input ports 305 of the additional expansion inbound M×N WSSs 205, by connecting add inputs 380 of expansion outbound M×N WSSs 250 to output ports 355 of the additional expansion outbound M×N WSSs 250, etc.). By cascading layers of M×N WSSs 205/250, optical node 425 may support unlimited add/drop port expansion.

The number and arrangement of elements shown in FIGS. 4A and 4B are provided as examples. In practice, optical node 400 and/or 425 may include additional degrees and/or WSSs 205/250, fewer degrees and/or WSSs 205/250, different degrees and/or WSSs 205/250, differently arranged degrees and/or WSSs 205/250, and/or differently sized WSSs than those shown and/or described in FIGS. 4A and 4B.

Implementations described herein provide an architecture for an optical node that achieves CDC add/drop with a single layer of components, namely a single M×N WSS (M≥D, N≥2D) connected to each inbound fiber and each outgoing fiber. The optical node that achieves CDC using the single of components has a reduced cost, complexity, and/or physical size as compared to a prior art optical node that achieves CDC add/drop.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical node, comprising:
   D (D≥2) input ports;
   D output ports; and
   D degrees, each degree, of the D degrees, including an inbound M×N (M≥D, N≥2D) wavelength selective switch (WSS) and an outbound M×N WSS,
   where each inbound M×N WSS includes:
      an input that connects to a respective input port of the D input ports,
      D−1 common inputs that connect to D−1 drop outputs, each of a respective inbound M×N WSS of the other degrees,
      D−1 express outputs that connect to D−1 express inputs, each of a respective outbound M×N WSS of the other degrees,
      D−1 drop outputs that connect to D−1 common inputs, each of a respective inbound M×N WSS of the other degrees, and
      at least one local drop port, and
   where each outbound M×N WSS includes:
      an output that connects to a respective output port of the D input ports,
      D−1 common outputs that connect to D−1 add inputs, each of a respective outbound M×N WSS of the other degrees,
      D−1 express inputs that connect to D−1 express outputs, each of a respective inbound M×N WSS of the other degrees,
      D−1 add inputs that connect to D−1 common outputs, each of a respective outbound M×N WSS of the other degrees, and
      at least one local add port.

2. The optical node of claim 1, where N≥2D+1, and where the optical node further comprises:
   an expansion inbound WSS comprising:
      D common inputs that connect to D drop outputs, each of a respective inbound M×N WSS of the D degrees; and
      at least one local drop port.

3. The optical node of claim 1, where N≥2D+1, and where the optical node further comprises:
   an expansion outbound WSS comprising:
      D common outputs that connect to D add inputs, each of a respective outbound M×N WSS of the D degrees; and
      at least one local add port.

4. The optical node of claim 1, where N≥2D+1, and where each degree, of the D degrees, further includes an expansion inbound WSS and an expansion outbound WSS,
   where each expansion inbound WSS includes:
      a common input that connects to a drop output of an inbound M×N WSS of a degree associated with the expansion inbound WSS,
      D−1 common inputs that connect to D−1 drop outputs, each of a respective expansion inbound WSS of the other degrees,
      D−1 express outputs that connect to D−1 express inputs, each of a respective expansion outbound WSS of the other degrees,
      D−1 drop outputs that connect to D−1 common inputs, each of a respective expansion inbound WSS of the other degrees, and
      at least one local drop port, and
   where each expansion outbound WSS includes:
      a common output that connects to an add input of an outbound M×N WSS of a degree associated with the expansion outbound WSS,
      D−1 common outputs that connect to D−1 add inputs, each of a respective expansion outbound WSS of the other degrees,
      D−1 express inputs that connect to D−1 express outputs, each of a respective expansion inbound WSS of the other degrees,
      D−1 add inputs that connect to D−1 common outputs, each of a respective expansion outbound WSS of the other degrees, and
      at least one local add port.

5. The optical node of claim 1, where an inbound M×N WSS and an outbound M×N WSS, associated with one of the D degrees, are optically independent WSSs arranged in a same physical space.

6. The optical node of claim 1, where an inbound M×N WSS or an outbound M×N WSS, associated with a degree of the D degrees, includes a 1×N WSS and (D−1) 1×(M−2D+2) WSSs.

7. The optical node of claim 1, where an inbound M×N WSS or an outbound M×N WSS, associated with a degree of the D degrees, includes a fewer than N M×1 optical switches.

8. An optical node, comprising:
   D (D≥2), input ports,
   D output ports, and
   D degrees, where each degree includes an inbound M×N (M≥D, N≥2D) wavelength selective switch (WSS) associated with a respective input port, and an outbound M×N WSS associated with a respective output port,
   where each inbound M×N WSS is to:
      receive optical signals from one input port and from inbound M×N WSSs of other degrees,
      provide optical signals to the inbound M×N WSSs of the other degrees for local drop at the other degrees,
      provide optical signals to outbound M×N WSSs of the other degrees, for their respective output ports, and
      provide optical signals to local drop ports; and
   where each outbound M×N WSS is to:

receive optical signals from the inbound M×N WSSs of the other degrees and from the outbound M×N WSSs of the other degrees for its respective output port, receive optical signals from local add ports for its respective output port, and provide optical signals from local add ports to the outbound M×N WSSs of the other degrees for their respective output ports.

9. The optical node of claim 8, where N≥2D+1, and where the optical node further comprises an expansion inbound WSS to:

receive optical signals from inbound M×N WSSs of each of the D degrees, and provide optical signals to local drop ports of the expansion inbound WSS.

10. The optical node of claim 8, where N≥2D+1, and where the optical node further comprises an expansion outbound WSS to:

receive optical signals from local add ports of the expansion outbound WSS, and provide optical signals to outbound M×N WSSs of each of the D degrees.

11. The optical node of claim 8, where N≥2D+1, and where each degree, of the D degrees, further includes an expansion inbound WSS and an expansion outbound WSS, where each expansion inbound WSS is to:

receive optical signals from an inbound M×N WSS associated with a respective degree, and from expansion inbound M×N WSSs of other degrees, provide optical signals to the expansion inbound M×N WSSs of the other degrees for local drop at the other degrees, provide optical signals to outbound M×N WSSs of the other degrees for their respective outputs to respective outbound M×N WSSs, and provide optical signals to local drop ports of the expansion inbound M×N WSS; and where each expansion outbound WSS is to:

receive optical signals from the expansion inbound M×N WSSs of the other degrees and from the expansion outbound M×N WSSs of the other degrees for its respective output to a respective outbound M×N WSS, receive optical signals from local add ports for its respective output to a respective outbound M×N WSS, and provide optical signals from local add ports to the expansion outbound M×N WSSs of the other degrees for their respective outputs to respective outbound M×N WSSs.

12. The optical node of claim 11, where each expansion inbound M×N WSS is further to:

provide optical signals to an additional expansion inbound M×N WSS associated with the respective degree.

13. The optical node of claim 11, where each expansion outbound M×N WSS is further to:

receive optical signals from an additional expansion outbound M×N WSS associated with the respective degree.

14. The optical node of claim 8, where an inbound M×N WSS and an outbound M×N WSS, associated with one of the D degrees, are optically independent WSSs arranged in a same physical space.

15. The optical node of claim 8, where an inbound M×N WSS or an outbound M×N WSS, associated with a degree of the D degrees, includes a 1×N WSS and (D−1) 1×(N−2D+2) WSSs.

16. The optical node of claim 8, where an inbound M×N WSS or an outbound M×N WSS, associated with a degree of the D degrees, includes fewer than N M×1 optical switches.

17. An optical node architecture, comprising:

D (D≥2) input ports and D output ports; and

D degrees, each including an inbound M×N (M≥D, N≥2D) wavelength selective switch (WSS) and an outbound M×N WSS, where each inbound M×N WSS includes:

an input that connects to a respective input port, a set of inputs that connect to a set of outputs, each of a respective inbound M×N WSS of other degrees, a set of outputs that connect to a set of inputs, each of a respective outbound M×N WSS of the other degrees, a set of outputs that connect to a set of inputs, each of a respective inbound M×N WSS of the other degrees, and at least one local drop port, and where each outbound M×N WSS includes:

an output that connects to a respective output port, a set of outputs that connect to a set of inputs, each of a respective outbound M×N WSS of the other degrees, a set of inputs that connect to a set of outputs, each of a respective inbound M×N WSS of the other degrees, a set of inputs that connect to a set of outputs, each of a respective outbound M×N WSS of the other degrees, and at least one local add port.

18. The optical node architecture of claim 17, where N≥2D+1, and where the optical node architecture further comprises:

an expansion inbound WSS comprising:

a set of inputs that connect to a set of outputs, each of a respective inbound M×N WSS of the D degrees; and at least one local drop port.

19. The optical node architecture of claim 17, where N≥2D+1, and where the optical node architecture further comprises:

an expansion outbound WSS comprising:

a set of outputs that connect to a set of inputs, each of a respective outbound M×N WSS of the D degrees; and at least one local add port.

20. The optical node architecture of claim 17, where N≥2D+1, and where each degree, of the D degrees, further includes an expansion inbound WSS and an expansion outbound WSS, where each expansion inbound WSS includes:

an input that connects to an output of an inbound M×N WSS of a degree associated with the expansion inbound WSS, a set of inputs that connect to a set of outputs, each of a respective expansion inbound WSS of the other degrees, a set of outputs that connect to a set of inputs, each of a respective expansion outbound WSS of the other degrees, a set of outputs that connect to a set of common inputs, each of a respective expansion inbound WSS of the other degrees, and at least one local drop port, and where each expansion outbound WSS includes:

an output that connects to an input of an outbound M×N WSS of a degree associated with the expansion outbound WSS, a set of outputs that connect to a set of inputs, each of a respective expansion outbound WSS of the other degrees, a set of inputs that connect to a set of outputs, each of a respective expansion inbound WSS of the other degrees, a set of inputs that connect to a set of outputs, each of a respective expansion outbound WSS of the other degrees, and at least one local add port.

\* \* \* \* \*